(12) United States Patent
Kim (10) Patent No.: US 8,267,487 B2
(45) Date of Patent: Sep. 18, 2012

(54) REGENERATIVE BRAKING ACTUATOR APPARATUS

(75) Inventor: Jongsung Kim, Seoul (KR)

(73) Assignee: Hyundai Mobis Co., Ltd. (KR)

( * ) Notice: Subject to any disclaimer, the term of this patent is extended or adjusted under 35 U.S.C. 154(b) by 530 days.

(21) Appl. No.: 12/621,868

(22) Filed: Nov. 19, 2009

(65) Prior Publication Data

US 2010/0148571 A1    Jun. 17, 2010

(30) Foreign Application Priority Data

Dec. 11, 2008    (KR) ................. 10-2008-0125712

(51) Int. Cl.
*B60T 8/88*    (2006.01)

(52) U.S. Cl. .............. 303/122.11; 303/113.4; 91/369.2

(58) Field of Classification Search ........... 303/122, 303/122.04, 122.09, 122.11, 113.3, 113.4, 303/114.1, 119.1; 91/369.2
See application file for complete search history.

(56) References Cited

U.S. PATENT DOCUMENTS

| 4,776,643 A | * | 10/1988 | Leiber | 303/122.11 |
| 5,699,713 A | * | 12/1997 | Mortimer | 91/369.2 |

FOREIGN PATENT DOCUMENTS

| JP | 10-119758 A | 5/1998 |
| JP | 2008-162462 A | 7/2008 |
| KR | 10-2002-0007614 A | 1/2002 |
| KR | 10-0391626 B1 | 7/2003 |
| KR | 10-0621162 B1 | 9/2006 |

\* cited by examiner

*Primary Examiner* — Melanie Torres Williams (74) *Attorney, Agent, or Firm* — Knobbe Martens Olson & Bear LLP (57) ABSTRACT

An actuator apparatus includes a booster creating an infinite boost ratio while a plunger valve does not contact with a reaction disc, and an oil reservoir and a pedal simulator unit forming a hydraulic circuit to follow hydraulic hysteresis characteristics. Therefore, it is possible to achieve insensibility of pedal changes transmitted from a master cylinder, minimize changes in pedal feel according to changes of pedal effort correspondingly generated, while blocking vibration transmitted to the pedal when achieving regenerative braking, and provide pedal feel following or simulating the hydraulic hysteresis characteristics.

11 Claims, 5 Drawing Sheets

VALVE BODY MOVED

REGENERATIVE BRAKING ACTUATOR APPARATUS

CROSS-REFERENCE TO RELATED APPLICATIONS

The present application is based on, and claims priority from, Korean Application Serial Number 10-2008-0125712, filed on Dec. 11, 2008, the disclosure of which is hereby incorporated by reference herein in its entirety.

BACKGROUND

1. Field

The present disclosure relates to an actuator apparatus that can be used in a regenerative braking system.

2. Discussion of the Related Technology

In general, a vehicle repeatedly starts and stops according to the environment while traveling, and consumes a lot of energy at stopping as well as starting, such that frequent and repeated starting and stopping considerably decreases the fuel efficiency.

Further, in generally, the rotational energy of a driving shaft is not temporarily stored in braking and re-used in starting, but is consumed as frictional energy due to braking.

However, vehicles that achieve regenerative braking, such as hybrid vehicles, fuel cell vehicle, or electric vehicles, require the braking system to be coupled with a regenerative braking apparatus and are controlled such that a braking force is changed to maximize efficiency of regenerative braking.

In this regenerative braking, in particular, it is important to prevent pedal feel that is transmitted to a driver from being deteriorated by reverse transmission of the braking force to the pedal through the booster, by maximally separating the braking force from the pedal force.

However, specific parts and devices other than the existing brake system are required to block the braking force that is transmitted to the brake pedal in vehicles equipped with a regenerative brake system, such that it needs to change the design due to increase of the number of parts and the cost is increased, and as a result, it is difficult to apply the configuration.

The foregoing discussion is to provide general background information, and does not constitute an admission of the prior art.

SUMMARY

An aspect of the invention provides an apparatus to achieve regenerative braking while minimizing changes of design and the number of parts, by allowing a regenerative braking actuator to maximally share parts of a brake system applied to a vehicle.

Another aspect of the present invention provides a regenerative braking actuator which considerably increases the boost ratio of the booster according to the pedal operation and also increases load transmitted to a pedal simulator for achieving pedal effort, such that it is possible to achieve insensibility of pedal changes transmitted from a master cylinder, minimize changes in pedal feel according to changes of pedal effort correspondingly generated, while blocking vibration transmitted to the pedal when achieving regenerative braking, and provide pedal feel following or simulating the hydraulic hysteresis characteristics.

In the regenerative braking actuator of one embodiment of the present invention, a motor-base driving unit following pedal displacement is provided in the booster to independently operate from pedal operation, such that it is possible to improve pedal feel transmitted to a driver, by blocking vibration transmitted to the pedal when achieving regenerative braking and follow the hydraulic hysteresis characteristics in the pedal simulator coupled with the pedal.

One aspect of the invention provides a regenerative braking actuator apparatus which includes a brake pedal, a booster, a pedal simulator, a first control valve, and an ECU. The booster is coupled with brake pedal through an operation rod, opens or closes an atmospheric pressure and vacuum passage using a plunger valve provided in a valve body, and creates an infinite boost ratio while maintaining non-contact between the plunger valve and a reaction disc transmitting load to a master cylinder. The pedal simulator is coupled with the brake pedal, and filled with oil and has at least one or more springs to provide pedal operation feel following or simulating hydraulic hysteresis characteristics. The first control valve is disposed in a first hydraulic line connected to the pedal simulator and opened or closed such that the oil flows out of the pedal simulator. The ECU controls the first control valve to discharge the oil in the pedal simulator, when the booster fails.

Another aspect of the invention provides a regenerative braking actuator apparatus which includes a brake pedal, an ECU, a booster, a booster operating unit, a pedal simulator, and a hydraulic circuit. The ECU detects the amount of pedal effort of the brake pedal using a sensor. The booster opens or closes an atmospheric pressure and vacuum passage using a plunger valve provided in a valve body, when the brake pedal is operated, and creates an infinite boost ratio while maintaining non-contact between the plunger valve and a reaction disc transmitting load to a master cylinder. The booster operating unit has a motor driven by the ECU and operates the booster by pushing the operation rod while converting the rotational force of the motor into an axial moving force. The pedal simulator is coupled with the brake pedal, and filled with oil and has at least one or more springs to provide pedal operation feel following or simulating hydraulic hysteresis characteristics. The hydraulic circuit operates a master cylinder by creating hydraulic pressure for pushing the operation rod to operate the booster to the booster operating unit, by making oil, which has flowed out of the pedal simulator receiving input load from the brake pedal, flow into the booster operating unit.

For this configuration, the booster includes a valve body that creates vacuum and atmospheric flow by disposing the plunger valve connected to the operation rod coupled with the brake pedal and the reaction disc transmitting boosted output to face each other. A non-contacting guider communicated with the space where the plunger valve and the reaction disc are disposed is bored through the valve body such that the plunger valve creates an infinite boost ratio while maintaining a non-contacting gap (a) without directly contacting with the reaction disc. A guide slot is longitudinally formed on the non-contact guider. A guide projection protruding from the plunger valve is fitted in the guide slot.

Further, the pedal simulator includes a chamber housing, a moving bracket, a pedal effort response member, and a return member. The chamber housing has a damper sectioning a space filled with oil therein. The moving bracket is moved by the connecting rod fixed to the brake pedal. The pedal effort response member has at least one or more springs having different lengths to apply reacting resistance to the moving bracket. The return member includes at least one or more springs elastically supporting the damper.

Further, the first hydraulic line is connected to an oil reservoir supplying oil to a master cylinder, and the first control valve is kept closed to prevent oil from being discharged out of the pedal simulator.

Further, the booster operating unit includes a housing, a motor, a decelerator, and a pressing nut. The housing is attached to the booster and connected to the hydraulic circuit to fill oil therein. The motor is controlled by the ECU to generate power. The decelerator includes driving and driven gears to convert the rotational force of the motor into output torque. The pressing nut is fitted on a screw shaft rotated by the output torque of the decelerator and operates the booster by pushing the operation rod using an axial straight moving force.

Further, in the hydraulic circuit, a first hydraulic line is connected to a housing of the booster operating unit from the pedal simulator and a second hydraulic line is connected to the first hydraulic line connected to the booster operating unit, from an oil reservoir, and a first control valve is disposed in the first hydraulic line and a second control valve is disposed in the second hydraulic line, such that the control valves are opened or closed by the ECU.

For this operation, when the first control valve is closed, the second control valve is opened, such that the control valves are always opened or closed in the opposite ways.

Further, the second hydraulic line is connected to the oil reservoir supplying oil to the master cylinder.

According to embodiments of the present invention, in a regenerative braking actuator, since the booster coupled with the pedal has a large boost ratio and large pedal load is transmitted to the pedal simulator, the pedal change transmitted from the master cylinder becomes insensitive, vibration transmitted to the pedal is further blocked, and the follow of hydraulic hysteresis characteristics is increased, such that it is possible to considerably improve pedal feel transmitted to a driver.

Further, according to embodiments of the present invention, since the regenerative braking actuator shares parts, such as booster and oil reservoir, which are parts included in the brake system of a vehicle, it is possible to minimize changes of design and the number of parts required for achieving regenerative braking.

Further, a regenerative braking actuator of embodiments of the present invention can improve pedal feel transmitted to the driver by preventing the pedal from operating the booster to block the vibration transmitted to the pedal through the booster in regenerative braking.

Further, in a regenerative braking actuator of embodiments of the present invention, the booster is independently operated from the pedal operation, such that it is possible to completely block the vibration to the pedal in regenerative braking.

BRIEF DESCRIPTION OF THE DRAWINGS

For better understanding of the nature and features of the present invention, reference should be made to the following detailed description with the accompanying drawings, in which.

DETAILED DESCRIPTION OF EMBODIMENTS

Embodiments of the present invention are described hereafter in detail with reference to the accompanying drawings and can be achieved in various ways by those skilled in the art, and the present subject matter is not limited to the embodiments described herein.

Figure 1:
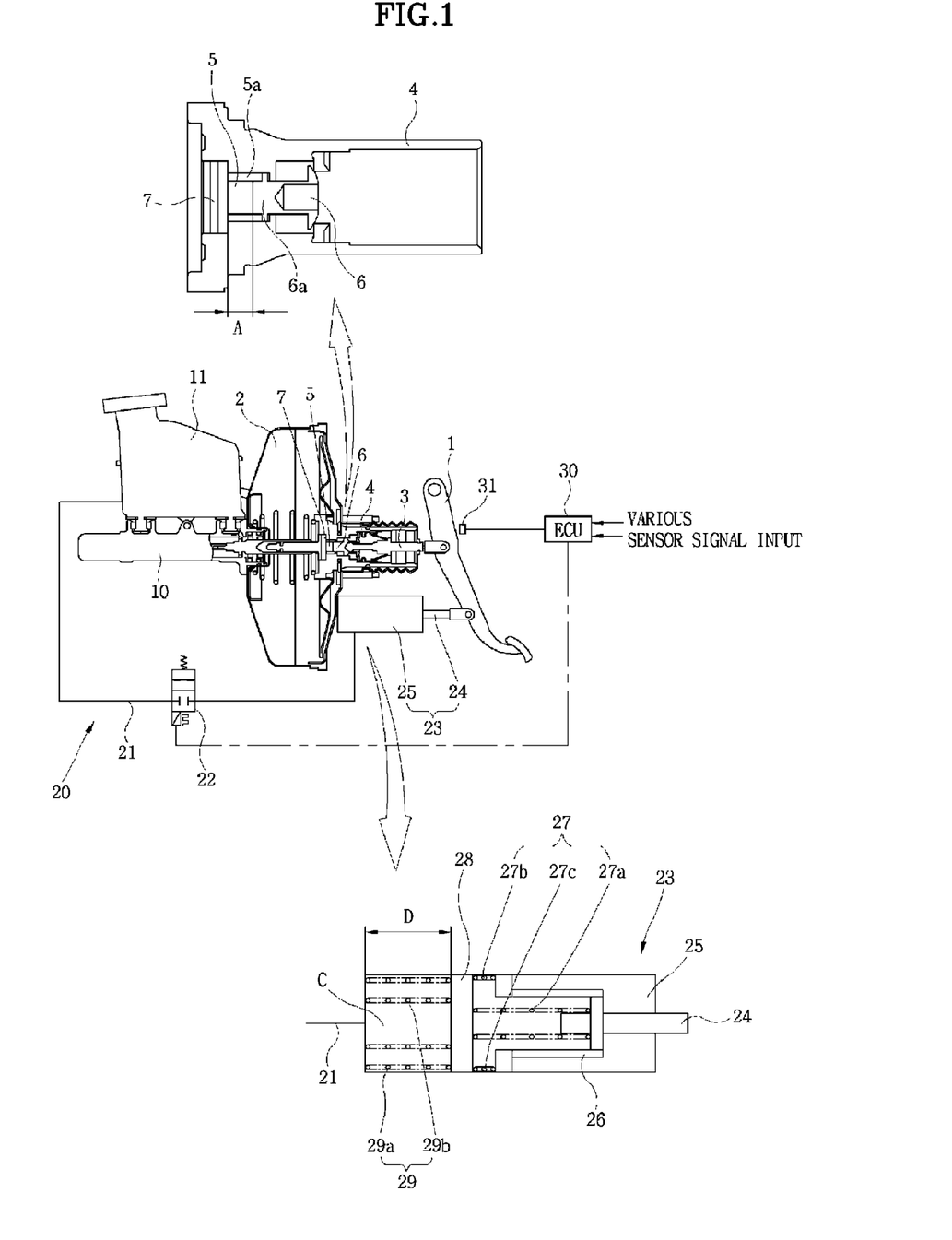
FIG. 1 is a view illustrating the configuration of a regenerative braking actuator apparatus according to one embodiment of the present invention.

FIG. 1 is a view illustrating the configuration of a regenerative braking actuator apparatus according to one embodiment of the present invention, in which the regenerative braking actuator apparatus of one embodiment of the present invention includes a brake pedal 1 and a booster 2. The booster 2 is coupled with brake pedal 1 by an operation rod 3, opens or closes an atmospheric pressure and vacuum passage using a plunger valve 6 provided in a valve body 4, and operates a master cylinder 10 by creating an infinite boost ratio without contacting with a reaction disc 7.

The regenerative braking actuator apparatus of one embodiment of the present invention is further provided with an oil reservoir 11, a hydraulic circuit, and a pedal simulator unit 20 coupled with brake pedal 1, to block vibration transmitted to brake pedal 1 and follow hydraulic hysteresis characteristics.

Further, the regenerative braking actuator apparatus of one embodiment of the present invention is provided with a sensor 31 that detects a pedal effort stroke of brake pedal 1 and an ECU 30 that constitutes an electric circuit and controls a hydraulic circuit formed by pedal simulator unit 20.

Further, ECU 30 receives a sensor signal for detecting conditions of a booster-connected system to recognize failure of booster 2.

Figure 2:
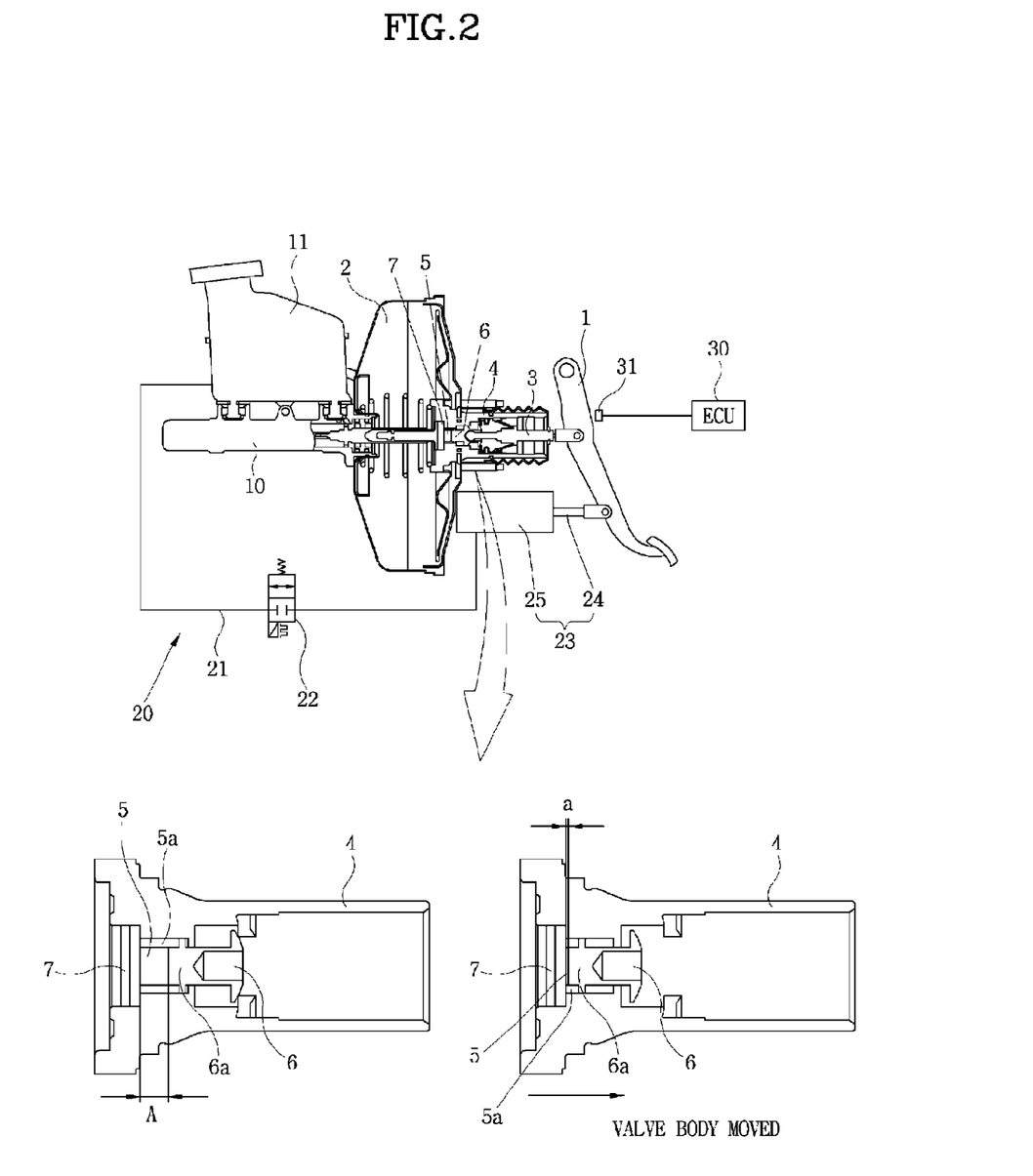
FIG. 2 is a view illustrating the configuration of an infinite boost ratio booster that is included in the regenerative braking actuator apparatus according to one embodiment of the present invention.

Booster 2 of the regenerative braking actuator apparatus of one embodiment of the present invention includes a valve body 4 which forms a vacuum valve and an exhaust valve. An operation rod 3 is coupled with brake pedal 1. A reaction disc 7 is disposed at the front of valve body 4 to apply boosted output to master cylinder 10, and a plunger valve 6 is disposed in valve body 4 to create infinite boost ratio without contacting with reaction disc 7.

For this configuration, a non-contact guider 5 is provided in valve body 4 and can defines a gap between reaction disc 7 and plunger valve 6 when being assembled and plunger 6 moves to reaction disc 7 along non-contact guider 5; however, the length of non-contact guider 5 is determined such that a non-contact gap (a) is maintained between plunger valve 6 and reaction disc 7, even though plunger valve 6 maximally moves to reaction disc 7.

The non-contact gap (a) is maintained because the length A of non-contact guider 5 is larger than the maximum stroke of plunger valve 6.

Further, a guide slot 5a is longitudinally formed on non-contact guider 5 to allow plunger valve 6 to stably move forward or backward while ensuring stable return, and to achieve this, a guide projection 6a is formed at plunger valve 6.

Booster 2 creates infinite boost ratio while plunger valve 6 does not contact with reaction disc 7, because the smaller the contact area between plunger valve 6 and reaction disc 7, the more the boost ratio of the booster increases.

The infinite boost ratio of booster 2 acts such that a changing force of booster 2 does not have influence on pedal feel.

This is because, as shown in FIG. 2, as operation rod 3 is operated by operation of brake pedal 1, pressure is reduced, such that plunger valve 6 maintains the non-contact gap (a) from reaction disc 7, even though plunger valve 6 moves to reaction disc 7, because the length A of non-contact guider 5 of valve body 4 is larger than the maximum stroke of plunger valve 6.

As plunger valve 6 moves forward or backward using guide projection 6a fitted in longitudinal guide slot 5a of non-contact guider 5, plunger valve 6 can stably move forward or backward while ensuring stable return.

Since non-contact guider 5 defining the non-contact gap (a) between plunger valve 6 and reaction disc 7 is formed at valve body 4 and the non-contact gap (a) is maintained after valve body 4 moves to plunger valve 6 even if the braking force is transmitted to brake pedal 1 particularly in reduction of pressure, such as ABS operation, plunger valve 6 prevents vibration that is reversely transmitted from being transmitted to brake pedal 1 through plunger valve 6.

Figure 3:
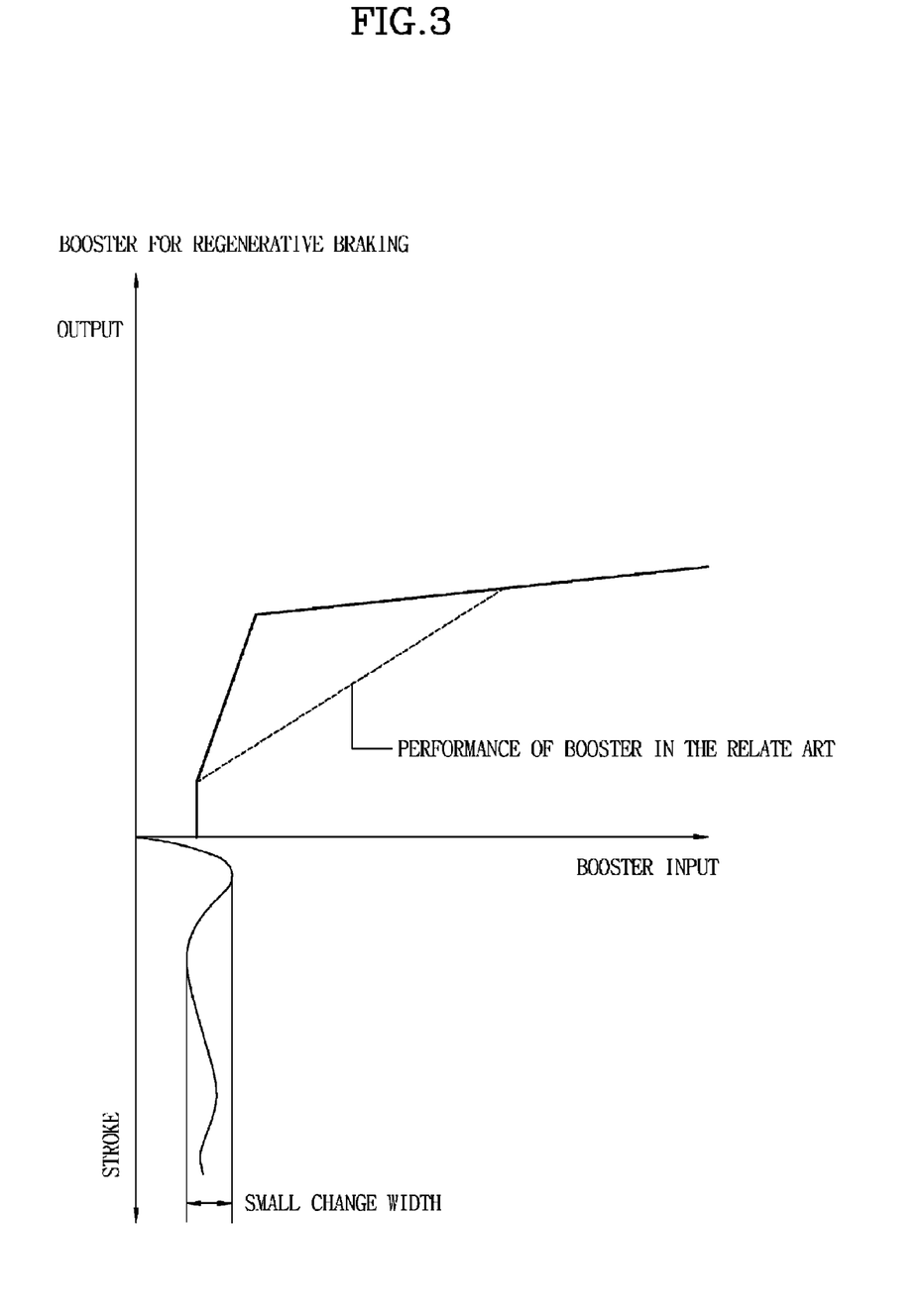
FIG. 3 is a pedal effort diagram of the regenerative braking actuator apparatus according to one embodiment of the present invention.

Therefore, booster 2 of this embodiment, as shown in FIG. 3, achieves performance of output-to-input that is little changed with respect to the stroke of brake pedal 1, that is, achieves a performance that shortens the section of an operation start force and does not practically changes load in the next section.

In addition to pedal simulator unit 20 having the hydraulic circuit to follow the hydraulic hysteresis characteristics, preventing the vibration can provide more excellent pedal operation feel.

Figure 4:
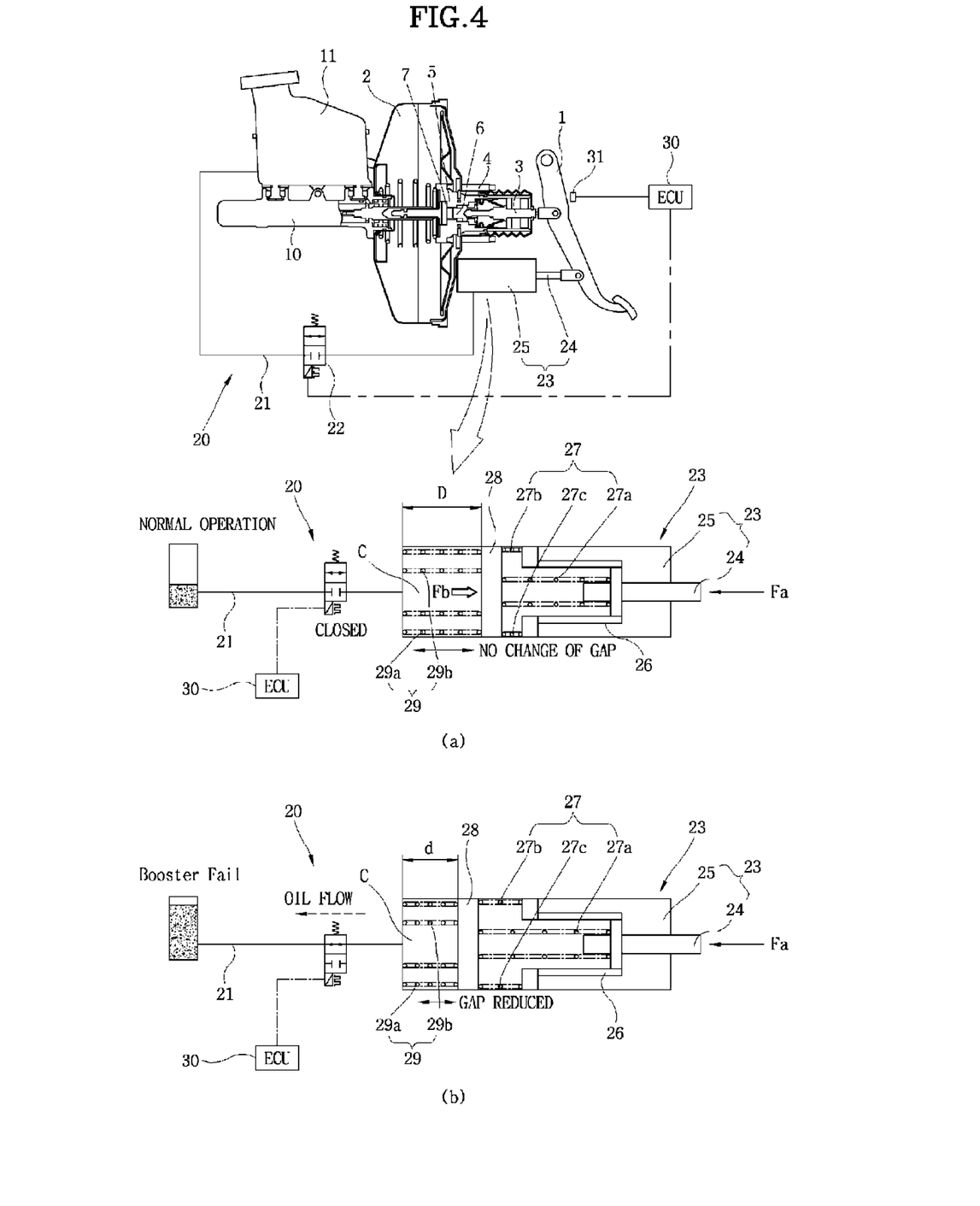
FIG. 4 is a view illustrating the configuration of a pedal simulator included in the regenerative braking actuator apparatus according one embodiment of to the present invention.

Further, pedal simulator unit 20 is connected with a connecting rod 24 coupled with brake pedal 1, and includes a pedal simulator 23 that allows pedal effort feel with respect to the stroke of brake pedal 1 to follow or simulate the hydraulic hysteresis characteristics and a first control valve 22 that is opened or closed by control of ECU 30 in a first hydraulic line 21 that forms an oil channel by connecting pedal simulator 23 and oil reservoir 11.

It is possible to configure a hydraulic circuit using an oil supply source in a vehicle, without using oil reservoir 11 that supplies oil to first hydraulic line 21, as an example.

Further, first control valve 22 is closed in a normal condition and opened in failure, which is for maintaining pedal simulator 23 filled with oil when it is closed and discharging the oil in pedal simulator 23 to the outside (oil reservoir 11) when is opened.

Pedal simulator 23 is connected with first hydraulic line 21, such that oil is filled therein, and is composed of a chamber housing where connecting rod 24 coupled with brake pedal 1 is inserted, a moving bracket 26 that is moved forward or backward by connecting rod 24, a pedal effort response member 27 that applies reacting resistance to moving bracket, and a damper 28 that is elastically supported by a return member 29 and makes a space by blocking an oil-filled space.

For this purpose, pedal effort response member 27 is composed of springs that are disposed up and down from the center of moving bracket 26, that is, a main spring 27a supported by the center of moving bracket 26 and first and second sub-brackets 27b, 27c that are supported above and under moving bracket 26.

Main spring 27a is larger in length than first and second sub-springs 27b, 27c.

Since pedal effort response member 27 is composed a plurality of springs 27a, 27b, 27c, as connecting rod 24 moves moving bracket 26 forward while being moved forward by brake pedal 1 pressed, main spring 27a is first compressed by movement of moving bracket 26, and then first and second sub-springs 27b, 27c are compressed with main spring 27a, as more load is continuously applied while brake pedal 1 is further pressed.

The compressed-deformation of main spring 27a and first and second sub-springs 27b, 27c at different time allows pedal operation feel of the driver to follow or simulate the hydraulic hysteresis.

Further, a plurality of return members 29 is composed of first and second return springs 29a, 29b, which ensures stable return of damper 28 and provides return pedal effort for brake pedal 1.

In pedal simulator 23 configures as described above, ECU 30 keeps first control valve 22 always closed, such that oil is always filled in chamber housing 25 sectioned by damper 28.

In this condition, as connecting rod 24 pushes moving bracket 26 by operation of brake pedal 1, moving bracket 26 compresses main spring 27a and first and second sub-springs 27b, 27c at different time in accordance with the amount of pedal effort of brake pedal 1.

That is, when the load Fa applied by brake pedal 1 just compresses main spring 27a and first and second sub-springs 27b, 27c and does not exceed reacting load Fb generated by damper 28 as shown in FIG. 4A, gap D with respect to the oil-filled space sectioned by damper 28 does not change and first and second return springs 29a, 29b are not compressed.

In this condition, increase of the amount of pedal effort of brake pedal 1 increases reacting force Fb of first and second return springs 29a, 29b to the load, together with the properties of the incompressible oil.

Since transmission of pedal operation feel to the driver is achieved by main spring 27a and first and second sub-springs 27b, 27c of pedal effort response member 27 as described above, it is possible to allow the pedal operation feel of the driver to follow or simulate the hydraulic hysteresis characteristics by adjusting coefficient of elasticity of the springs.

However, when detecting failure of booster caused by various factors, ECU 30 opens first control valve 22 as shown in FIG. 4B such that the oil in pedal simulator 23 flows outside by movement (d) of damper 28 and returns to oil reservoir 11 through first hydraulic line 21 in order to minimize a force that is consumed by pedal simulator 23 when brake pedal 1 is operated.

Due to discharge of oil, even though brake pedal 1 is operated and connecting rod 24, moving bracket 26, and pedal effort response member 27 correspondingly move damper 28 while being pushed, the pressing force Fa of brake pedal 1 is not supported by pedal simulator 23, such that the force consumed by pedal simulator 23 can be minimized.

Figure 5:
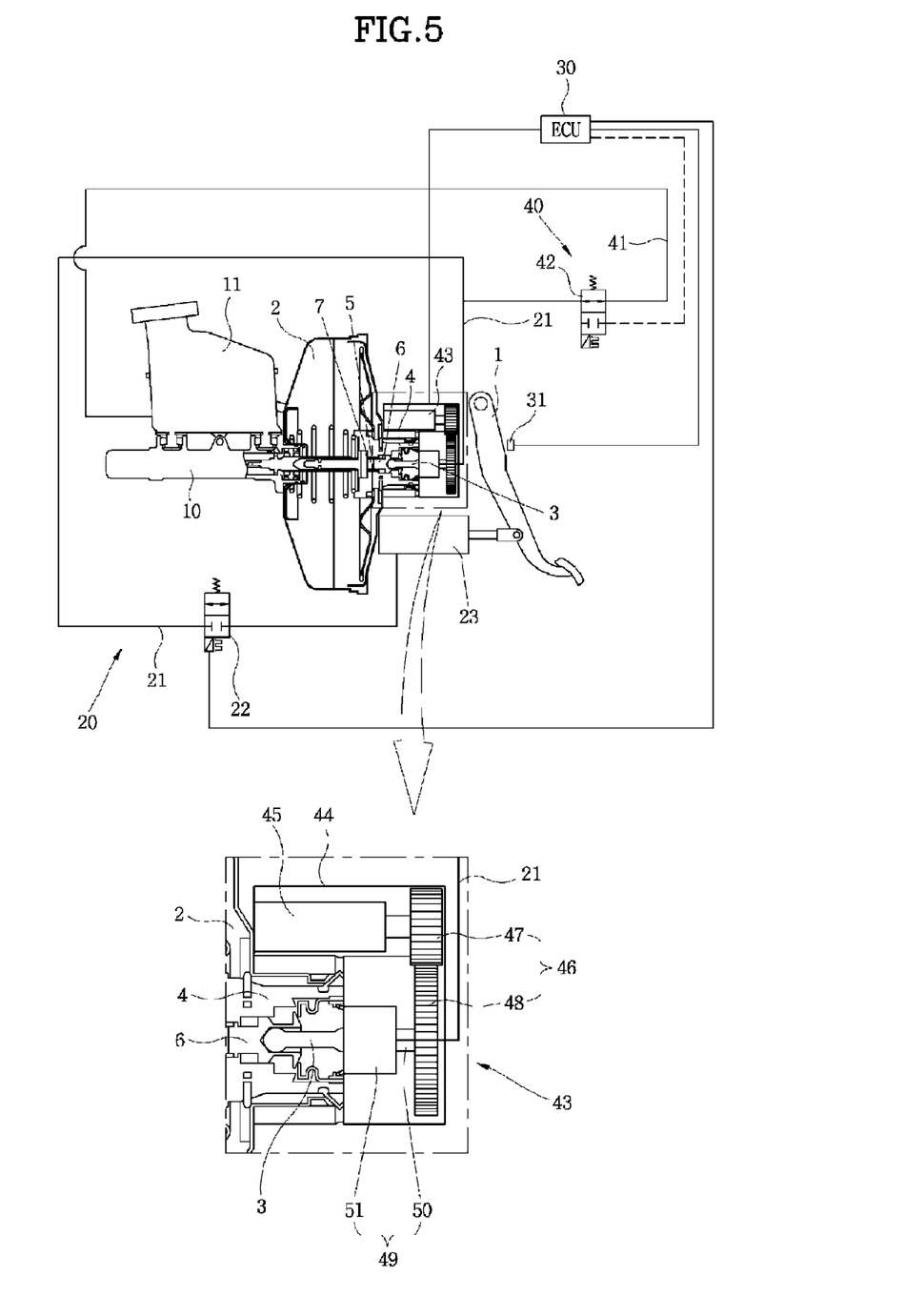
FIG. 5 is a view showing a regenerative braking actuator apparatus one embodiment of according to the present invention.

Meanwhile, the actuator apparatus of one embodiment of the present invention can be modified in various ways, and for example, booster 2 may be operated, not by brake pedal 1, but by a motor 45 that is driven by ECU 30 detecting the stroke of brake pedal 1 using a sensor 31.

The modified actuator apparatus includes an ECU 30 that detects the stroke of a brake pedal 1 using a sensor 31 and generates control signals and a booster 2 that is operated without input through brake pedal 1, opens or closes an atmospheric pressure and vacuum passage using a plunger valve 6, and operates a master cylinder 10 by creating an infinite boost ratio without contacting with a reaction disc 7.

Booster 2 has the same configuration as the booster according to the above embodiment and detailed description is not provided.

The actuator apparatus is further provided with a pedal simulator 23 that forms a hydraulic circuit and is coupled with brake pedal 1 to block vibration transmitted to brake pedal 1 and follow the hydraulic hysteresis characteristics.

Pedal simulator 23 has the same configuration as the pedal simulator according to the above embodiment and detailed description is not provided.

The actuator apparatus includes a booster operating unit 40 that has a motor 45 driven by ECU 30, converts a rotational force of motor 45 into an axial moving force, and operates booster 2 by pushing an operation rod 3.

For this operation, booster operating unit 40 pushes operation rod 3 of booster 2 after converting the operational force of motor 45 into an axial moving force, using a motor-based driving unit 43, in which, for example, an EPB (Electro Parking Brake) or an EMB (Electro Mechanical Brake) where or a BBW (Brake By Wire) technology is applied may be used as motor-based driving unit 43.

Motor-based driving unit 43 is generally composed of a power generating motor 45 disposed in a housing 44, which is attached to booster 2 and filled with oil, and controlled by ECU 30, a decelerator 46 composed of driving and driven gears 47, 48 to convert the rotational force of motor 45 into output torque, and a motion converting member 49 that pushes operation rod 3 to operate booster 2 by converting the output torque of decelerator 46 into an axial straight moving force.

In decelerator 46, a plurality of gears is used for driven gear 48 to convert rotation of driving gear 47 into larger output torque.

Further, motion converting member 49 is composed of a screw shaft 50 that is rotated by decelerator 46 and a pressing nut 51 that generates an axial straight moving force by rotation of screw shaft 50.

In addition, in the regenerative braking actuator apparatus, pedal simulator 23 and booster operating unit 40 form a hydraulic circuit, together with oil reservoir 11, and according to the hydraulic circuit having this configuration, minimum operational force for booster 2 can be provided by transmitting pedal effort of brake pedal 1 to booster operating unit 40 through oil when booster 2 fails.

For this operation, the hydraulic circuit is configured such that a first hydraulic line 21 connected to housing 44 of booster operating unit 44 from pedal simulator 23 and a second hydraulic line 41 connected to first hydraulic line 21 connected to booster operating unit 40, from oil reservoir 11.

In addition, a first control valve 22 is disposed in first hydraulic line 21 and a second control valve 42 is also disposed in second hydraulic line 41, such that they are opened or closed by control of ECU 30.

First control valve 22 is closed in a normal condition and opened in failure, whereas second control valve 42 is opened in a normal condition and closed in failure.

Therefore, while booster 2 normally operates, the oil filled in pedal simulator 23 cannot flow to booster operating unit 40 through first hydraulic line 21 and oil is supplied to booster operating unit 40 from oil reservoir 11 through second hydraulic line 41.

The modified actuator apparatus of one embodiment of the present invention operates booster 2 without using brake pedal 1, which is simply described.

That is, the stroke of brake pedal 1 pressed down by a driver is inputted to ECU 30 by sensor 31, ECU 30 drives motor 45 at a number of revolution corresponding to the amount of pedal effort, and the rotation of motor 45 is converted into output torque through decelerator 46.

In this operation, second control valve 42 in second hydraulic line 41 connected to oil reservoir 11 is opened.

Next, decelerator 46 rotates screw shaft 50 and pressing nut 51 fitted on screw shaft 50 pushes operation rod 3 while being axially loosened out.

Operation rod 3 pushed by motor 45 operates in the same way as the above embodiment, that is, plunger valve 6 defines a non-contact gap (a) with respect to reaction disc 7, which makes it possible to achieve performance of the booster, as shown in FIG. 3, by infinitely increasing the boost ratio of the booster.

Further, since the non-contact gap (a) is defined between plunger valve 6 and reaction disc 7, booster 2 prevents the braking force from reversely transmitted to brake pedal 1.

While the booster normally operates, as in the above embodiment, pedal simulator 23 moves moving bracket 26 according to the amount of pedal effort of brake pedal 1 to compress main spring 27a and first and second sub-springs 27b, 27c at different time, such that the pedal operation feel transmitted to the driver follows or simulates the hydraulic hysteresis characteristics by action of oil filled in housing 25.

In this operation, first control valve 22 of first hydraulic line 21 connected to pedal simulator 23 is closed.

In one modified embodiment of the present invention, the actuator apparatus also blocks vibration and provides excellent pedal operation feel following or simulating the hydraulic hysteresis characteristics.

However, when detecting failure of booster 2 due to various factors, ECU 30 opens first control valve 22 of first hydraulic line 21 and closes second control valve 42 of second hydraulic line 41.

As control valves 22, 42 are converted, oil in pedal simulator 23 flows out and into booster operating unit 40, such that a hydraulic circuit that prevents oil from flowing into oil reservoir 11 is achieved.

Therefore, the pedal input Fa cannot be supported by pedal simulator 23, even though brake pedal 1 is operated, such that the pedal input Fa consumed by pedal simulator 23 is minimized and the oil flowing into booster operating unit 40 from pedal simulator 23 acts as load operating booster 2.

That is, the oil flowing in booster operating unit 40 through first hydraulic line 21 from pedal simulator 23 flows into housing 44 of motor-based driving unit 43, and hydraulic pressure created by the flow of the oil acts to decelerator 46.

As described above, the pressure applied to decelerator 46 makes driven gear 48 of decelerator 46 slide with respect to driving gear 47, and driven gear 48 sliding pushes screw shaft 50 and pressing nut 51, such that operation rod 3 is pushed.

As operation rod 3 is pushed, booster 2 operates master cylinder 10 by operation of plunger valve 6 and reaction disc 7, thereby braking a vehicle as in a normal state, which provides additional function for achieving safety by braking the vehicle in any circumstances.

What is claimed is:
1. A braking apparatus comprising:
a brake pedal;
a booster that is coupled with the brake pedal, comprises a reaction disc and a plunger valve provided in a valve body, and is configured to maintain non-contact between the plunger valve and the reaction disc to create an infinite boost ratio;
a pedal simulator that is coupled with the brake pedal, contains oil, and has one or more springs;

a first control valve that is hydraulically connected to the pedal simulator, and is configured to selectively allow the oil to flow out of the pedal simulator; and an ECU that is configured to control opening of the first control valve to discharge the oil in the pedal simulator when the booster fails.

2. The braking apparatus as defined in claim 1, wherein the booster comprises:
a valve body accommodating the plunger valve and the reaction disc to face each other,
a non-contacting guider that communicates with spaces where the plunger valve and the reaction disc are disposed, and is bored through the valve body such that non-contact between the plunger valve and the reaction disc is maintained,
a guide slot is longitudinally formed on the non-contacting guider, and
a guide projection protruding from the plunger valve and received in the guide slot.

3. The braking apparatus as defined in claim 1, wherein the pedal simulator includes:
a chamber housing that has a damper sectioning a space that contains oil therein;
a moving bracket that is linked to the brake pedal to be moved by the movement of the brake;
a pedal effort response member that has the one or more springs having different lengths to apply reacting resistance to the moving bracket; and
a return member that includes one or more springs elastically supporting the damper.

4. The braking apparatus as defined in claim 1, wherein the first control valve is connected to an oil reservoir supplying oil to a master cylinder, and wherein the first control valve is kept closed to prevent oil from being discharged out of the pedal simulator during normal operation of the booster.

5. A braking apparatus comprising:
a brake pedal;
an ECU that is configured to detect an amount of pedal effort of the brake pedal using a sensor;
a booster that comprises a reaction disc and a plunger provided in a valve body, and is configured to maintain non-contact between the plunger valve and a reaction disc to create an infinite boost ratio;
a booster operating unit that has a motor driven by a signal transmitted from the ECU, the signal being associated with the amount of pedal effort of the brake pedal, and a converter configured to convert rotation of the motor to linear movement so as to move the plunger valve;
a pedal simulator that is coupled with the brake pedal, contains oil, and has one or more springs; and
a hydraulic circuit that is configured to operate a master cylinder, and is further configured to create hydraulic pressure for pushing an operation rod by making oil to flow out of the pedal simulator and flow into the booster operating unit.

6. The braking actuator apparatus as defined in claim 5, wherein the booster comprises:
a valve body accommodating the plunger valve and the reaction disc to face each other,
a non-contacting guider that communicates with spaces where the plunger valve and the reaction disc are disposed, and is bored through the valve body such that non-contact between the plunger valve and the reaction disc is maintained,
a guide slot is longitudinally formed on the non-contacting guider, and
a guide projection protruding from the plunger valve and received in the guide slot.

7. The braking actuator apparatus as defined in claim 5, wherein the pedal simulator includes:
a chamber housing that has a damper sectioning a space that contains oil therein;
a moving bracket that is linked to the brake pedal to be moved by the movement of the brake;
a pedal effort response member that has the one or more springs having different lengths to apply reacting resistance to the moving bracket; and
a return member that includes one or more springs elastically supporting the damper.

8. The regenerative braking apparatus as defined in claim 5, wherein the booster operating unit includes:
a housing that is attached to the booster and connected to the hydraulic circuit to contain oil therein.

9. The braking apparatus as defined in claim 8, wherein the hydraulic circuit comprises a first hydraulic line between the housing of the booster operating unit and the pedal simulator and a second hydraulic line between the booster operating unit and an oil reservoir, and
wherein the hydraulic circuit further comprises a first control valve is disposed in the first hydraulic line and a second control valve is disposed in the second hydraulic line, such that the control valves are configured to be opened or closed by the ECU.

10. The braking apparatus as defined in claim 9, wherein the second control valve is configured to be opened when the first control valve is closed.

11. The braking apparatus as defined in claim 9, wherein the first control valve is configured to be opened when the booster fails.

* * * * *